United States Patent
Schinasi et al.

(10) Patent No.: US 9,821,362 B2
(45) Date of Patent: Nov. 21, 2017

(54) DEVICE FOR THE STABILISATION OF DRAIN AND/OR FILL VALVES FOR A FLEXIBLE CONTAINER INTENDED FOR THE TRANSPORTATION OF LIQUIDS OR PULVERULENT MATERIALS

(71) Applicant: CODEFINE S.A., Lausanne (CH)

(72) Inventors: Piero Schinasi, Epalinges (CH); Stephane Levy, Lausanne (CH)

(73) Assignee: CODEFINE, S.A., Lausanne (CH)

( * ) Notice: Subject to any disclaimer, the term of this patent is extended or adjusted under 35 U.S.C. 154(b) by 11 days.

(21) Appl. No.: 14/354,438

(22) PCT Filed: Oct. 21, 2012

(86) PCT No.: PCT/IB2012/055783
§ 371 (c)(1),
(2) Date: Apr. 25, 2014

(87) PCT Pub. No.: WO2013/061230
PCT Pub. Date: May 2, 2013

(65) Prior Publication Data
US 2014/0237789 A1    Aug. 28, 2014

(30) Foreign Application Priority Data
Oct. 28, 2011   (CH) ...................................... 1740/11

(51) Int. Cl.
*B25B 5/16* (2006.01)
*B21D 39/04* (2006.01)
(Continued)

(52) U.S. Cl.
CPC .......... *B21D 39/046* (2013.01); *B65D 47/06* (2013.01); *B65D 90/54* (2013.01); *F16K 27/06* (2013.01); *Y10T 29/53987* (2015.01)

(58) Field of Classification Search
USPC ........................................................ 29/282
See application file for complete search history.

(56) References Cited

U.S. PATENT DOCUMENTS

| 3,448,889 A | * | 6/1969 | Malpas | ................. | B65D 47/06 |
| | | | | | 220/62.21 |
| 4,055,179 A | * | 10/1977 | Manschot | ............. | A61F 5/4405 |
| | | | | | 251/333 |

(Continued)

FOREIGN PATENT DOCUMENTS

| GB | 654221 A | * | 6/1951 | ............... G01S 1/02 |
| GB | 1011328 A | * | 11/1965 | ............... G03D 3/06 |

(Continued)

*Primary Examiner* — Larry E Waggle, Jr.
*Assistant Examiner* — Alvin Grant
(74) *Attorney, Agent, or Firm* — Volpe and Koenig, P.C.

(57) ABSTRACT

The device for stabilizing drain and/or fill valves for a flexible container for conveying liquids or pulverulent materials is characterized by use of a non-strictly cylindrical valve comprising at least one of the following three members: a lug in a low position formed by an extension of a through valve key, a polygonal proximal flange or a partially polygonal protuberance, and in that a stabilizing plate has both a recess corresponding to and following the shape of the said chosen member, and two pads of loops and hooks stuck to the proximal surface and intended to co-operate with pads of loops and hooks sewn and/or stuck to the outer surface of the flexible container opposite the said first pads, the resulting device, when assembled, preventing the valve from rotating on itself when a drain pipe and/or fill pipe is screwed to or unscrewed from the valve.

7 Claims, 3 Drawing Sheets

(51) Int. Cl.
*B65D 47/06* (2006.01)
*B65D 90/54* (2006.01)
*F16K 27/06* (2006.01)

(56) References Cited

U.S. PATENT DOCUMENTS

| | | | |
|---|---|---|---|
| 4,934,654 A | 6/1990 | Linnemann | |
| 5,353,982 A * | 10/1994 | Perkins | B65D 77/065 229/117.3 |
| 5,586,690 A * | 12/1996 | Ettore | B31B 7/00 222/105 |
| 6,253,993 B1 * | 7/2001 | Lloyd | B65D 5/2047 229/112 |
| 6,347,718 B1 * | 2/2002 | Karpisek | B65D 77/061 206/600 |
| 6,962,321 B1 | 11/2005 | Savage et al. | |
| 7,182,312 B1 * | 2/2007 | Speranza | F16K 1/308 251/144 |
| 7,322,558 B2 * | 1/2008 | Cong | H01F 17/0006 137/614.2 |
| 8,651,365 B2 * | 2/2014 | Lymn | B65D 5/04 137/343 |
| 2005/0025396 A1 * | 2/2005 | ErkenBrack | B65D 33/2591 383/63 |
| 2006/0039776 A1 * | 2/2006 | Schutz | F16B 37/0885 411/432 |
| 2006/0078234 A1 | 4/2006 | Chandra et al. | |
| 2010/0122981 A1 * | 5/2010 | Sims | F16K 27/067 220/1.6 |

FOREIGN PATENT DOCUMENTS

| | | |
|---|---|---|
| GB | 2188305 A | 9/1987 |
| WO | 2010150160 A1 | 12/2010 |
| WO | 2011054356 A1 | 5/2011 |

* cited by examiner

DEVICE FOR THE STABILISATION OF DRAIN AND/OR FILL VALVES FOR A FLEXIBLE CONTAINER INTENDED FOR THE TRANSPORTATION OF LIQUIDS OR PULVERULENT MATERIALS

FIELD OF INVENTION

The invention relates to a device for stabilizing drain valves and/or fill valves for a flexible container for conveying liquids or pulverulent materials.

BACKGROUND

Liquid substances, e.g. concentrated fruit juice or pulverulent materials, are conventionally conveyed in rigid containers such as metal or plastic vats.

This method of transport has two main disadvantages—the bulk of the empty vats when conveyed before or after conveying the liquid, and the weight, particularly of metal vats.

It has therefore been proposed to remedy the disadvantages by using flexible envelopes or liners adapted to convey liquids and positioned either in movable rigid containers or in likewise flexible containers, mainly envelopes of woven fabric.

A flexible envelope associated with a flexible container is the most radical solution and also the most efficient as regards reduction of weight and bulk when empty. It is also the most advantageous economically.

However, a flexible envelope associated with a flexible container has a disadvantage compared with a vat or a rigid container.

During filling or emptying, the valve has to be secured to the drain or fill pipe, which involves moving the pipe when screwed to the valve body. Rigid containers enable the valve to be firmly secured to the container, thus ensuring a fixed, invariable position of the valve even and particularly when subjected to a screwing operation. The problem is precisely the same with a bayonet fastening.

On the other hand a flexible container cannot be secured so as to fix the valve in an invariable position. The essential operation, i.e. connecting or disconnecting the valve to or from the fill or drain pipe, is therefore hazardous since the inner envelope is very sensitive to twisting or rolling and may break by tearing.

SUMMARY

The aim of the invention is to reduce the said basic disadvantages convincingly and in an industrially reliable manner.

The invention accordingly relates to a device for stabilizing drain and/or fill valves for a flexible container for conveying liquids or pulverulent materials, characterized by use of a non-strictly cylindrical valve comprising at least one of the following three members: a lug in a low position formed by an extension of a through valve key, a polygonal proximal flange or a partially polygonal protuberance, and in that a stabilizing plate has a recess corresponding to and following the shape of the said chosen member, and two pads of loops and hooks stuck to the proximal surface and adapted to co-operate with pads of loops and hooks sewn and/or stuck to the outer surface of the flexible container opposite the said first pads, the resulting device, when assembled, preventing the valve from rotating on itself when the drain and/or fill pipe is screwed to or unscrewed from the valve.

Roughly and in principle, the invention relates to a combination of two components which are intellectually distinct and neither of which gives the desired effect by itself.

The first component is the choice of the valve or preferred valve family. The second component, which is dependent on and also inspires the first, consists in novel adjustments to the construction, taking advantage of the chosen characteristics of the first component.

All the valves usable in this particular situation have a cylindrical body having a thread, usually external. This feature is dictated by the need to couple to the drain pipe and/or fill pipe. The valves also have a flange for securing the valve to the inner envelope containing the liquid.

The valves mainly used have an opening and closing key which extends right through the cylindrical valve body, the end being either free or hidden in a blind hole. The special feature of these valves is that they have a lug in a low position, firmly secured in rotation to the body.

Use is also made of valves having a flange with a rigid central part and a polygonal, e.g. square, neck.

Finally use may be made of a valve having a protuberance, preferably in a low position, on its body near the flange. Ideally the protuberance is in the form of a trapezium having its major base opposite the valve body.

The cited adjustment to the construction comprise a stabilizing plate formed with a recess which partly follows the shape of the valve, more specifically follows the grip provided by the lug on the key, i.e. the trapezoidal protuberance or the polygonal contour of the central flange.

These adjustments include the positioning of pairs of movable attachment means on the outer surface of the flexible container and on the proximal surface of the plate, the movable attachment means comprising pads of loops and hooks co-operating in pairs. The pads, which are sewn or stuck to the flexible container, are positioned opposite pads stuck to the proximal surface of the plate.

BRIEF DESCRIPTION OF THE DRAWINGS

After this general presentation, we will now describe the features of the device according to the invention by illustrating a few variants and referring to the drawings, in which.

DETAILED DESCRIPTION OF THE PREFERRED EMBODIMENTS

Figure 1:
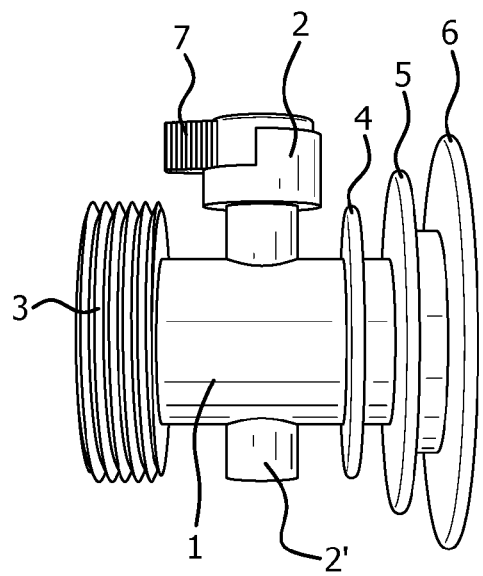
FIG. 1 is a perspective view of a first valve in the device according to the invention.

FIG. 1 shows a valve body, through which a key 2 extends from one side to the other. The drawing also shows screw-threading 3 for screwing an outer pipe for emptying or filling the container. There are also various flanges 4, 5, 6, the two latter being used to fix the valve to the envelope for holding the liquid.

Note that opposite a control lever 7 for the valve key, the bottom part of the key 2' is in the form of a lug, firmly secured in rotation to the valve body.

Figure 2:
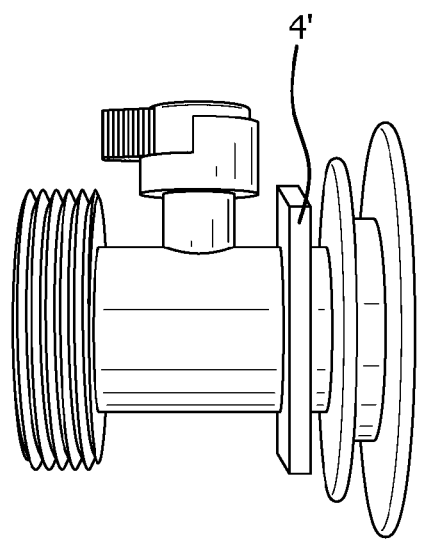
FIG. 2 is a perspective view of a second valve in the device according to the invention.

FIG. 2 shows the same components as on FIG. 1, and will not be described again. Attention is drawn to the fact that this time, the first flange 4' is thicker than before, more particularly square.

Figure 3:
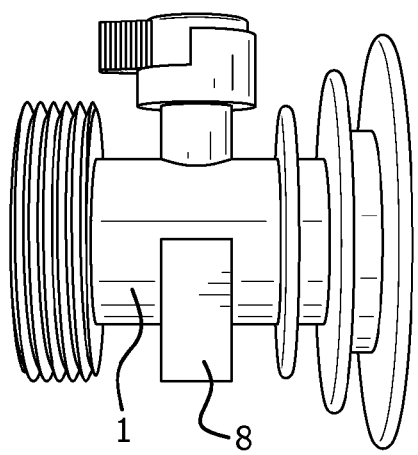
FIG. 3 is a perspective view of a third valve in the device according to the invention.

FIG. 3 shows the same components as in FIG. 1 but the bottom part of the valve body 1 has an additional protuberance 8, shown here in cross-section but representing the surface of a substantially trapezoidal base.

Figure 4:
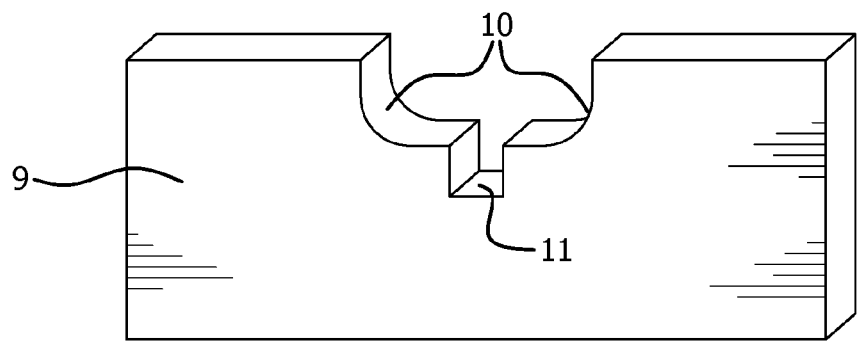
FIGS. 4, 5 and 6 each give a perspective view of the stabilizing plate according to the invention, each respective plate being adapted to co-operate with the specific valve shown in FIGS. 1, 2 and 3 in that order.

FIG. 4 shows a stabilizing plate 9, which has a recess, the main part 10 of which is adapted to follow the shape of the cylindrical valve body whereas an additional recess 11 likewise follows the shape of a lug 2' in the form of an extension at the bottom of the valve key as shown in FIG. 1.

The plate is preferably made of cellular polypropylene (honeycomb) because of the rigidity, solidity and lightness of this material.

Figure 5:
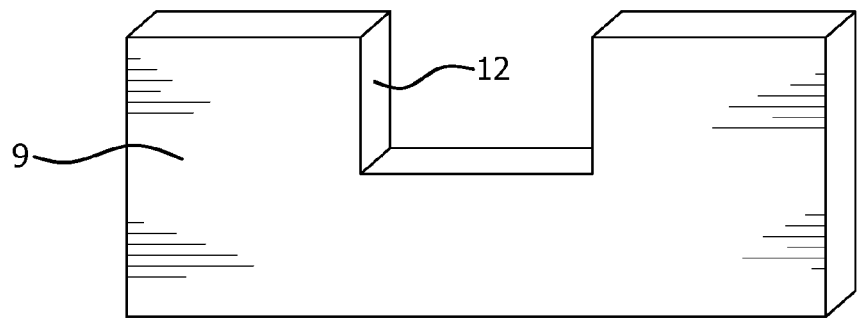

In FIG. 5, the recess in the stabilizing plate 9 is substantially square and follows the square shape of the first flange 4' shown in FIG. 2.

Figure 6:
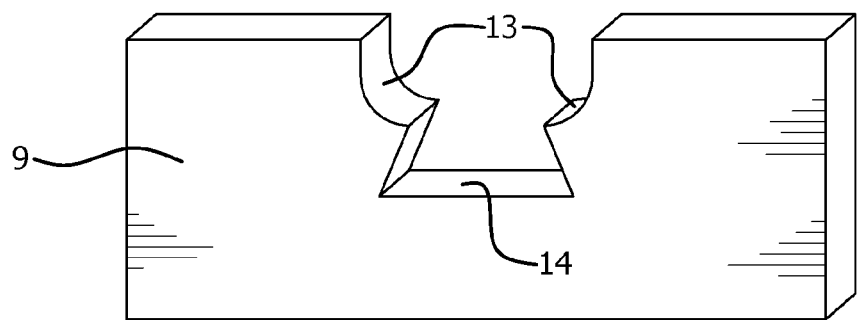

In FIG. 6, as already in FIG. 4, the stabilizing plate 9 has a recess in two parts, the first part 13 being substantially circular and following the shape of the cylindrical valve body whereas the second part 14 is in the shape of a trapezium and co-operates with the trapezoidal protuberance 8 shown in cross-section in FIG. 3.

With regard to the terminology, we prefer "stabilizing plate" to "fixing plate", thus showing that the main aim is to prevent the valve rotating on its axis when screwing or unscrewing the fill pipe or drain pipe. However it is not the aim to prevent the valve from making any other small movements, which should be tolerated and permitted by the device. It should also be remembered that the outer envelope forming the flexible container is of woven cloth, e.g. polypropylene, thus inevitably reducing the rigidity of the assembly.

Figure 7:
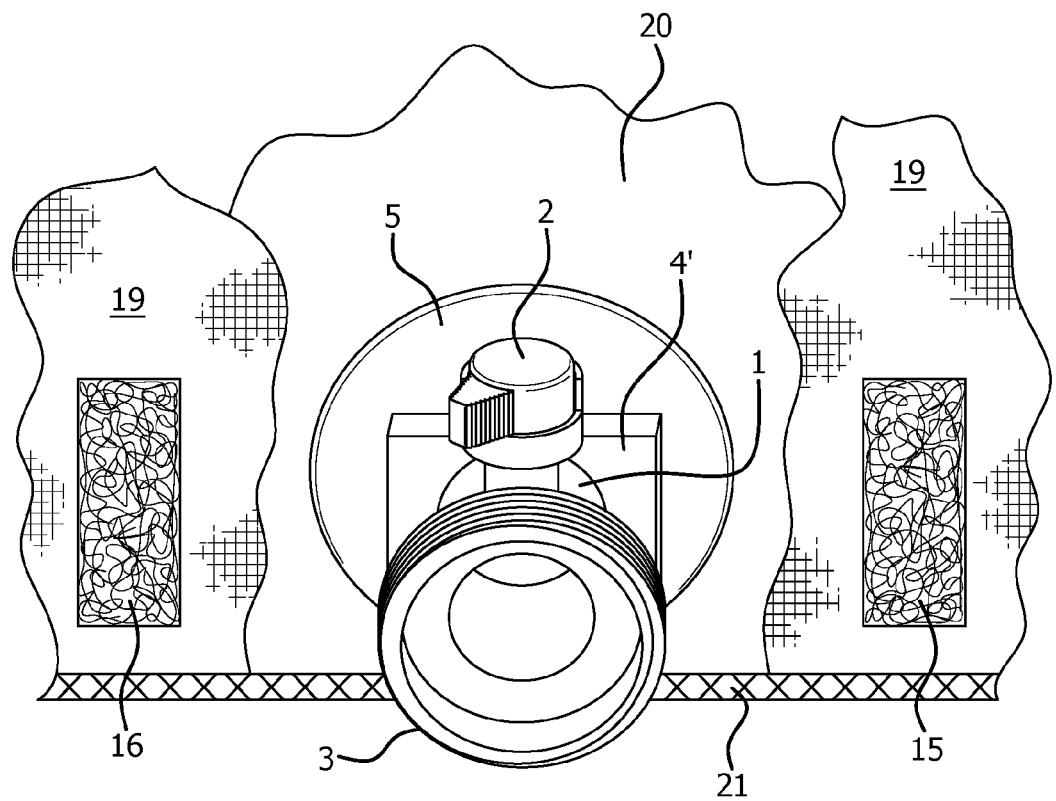
FIG. 7 is a perspective view of the various components making up the device according to the invention.
Figure 7:
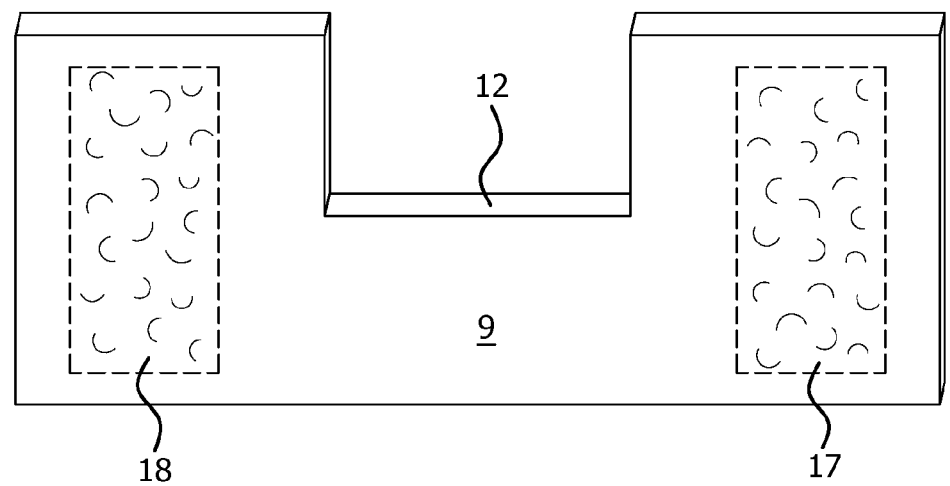

FIG. 7 is a partial view of the inner envelope or liner 20 for holding the liquid.

There is also a partial view of the flexible container 19 along one of its bottom edges, where a seam 21 connects a vertical wall to the base of a large bag constituting the flexible container. The vertical surface of the flexible container has a recess or flap revealing the valve.

FIG. 7 shows a valve as in FIG. 2, comprising a cylindrical body, a screwthread 3, a valve key 2 and a proximal square flange 4'.

As can be seen, the vertical surface of the flexible container has two strips of pads of loops and hooks 15 and 16, sewn and/or stuck to the outer surface of the flexible cloth container 19.

These two strips of loops and hooks 15, 16 are disposed opposite two pads of loops and hooks 18 and 19, shown in broken lines in the drawing, stuck to the proximal surface (relative to the valve) of the stabilizing plate 9.

Finally the stabilizing plate 9 corresponds to that illustrated in FIG. 5, i.e. has a square recess 12.

At this stage of the description, it will easily be seen that the recess 12 in the plate encloses the square flange 4', and once the strips of loops and hooks are co-operating in pairs, the ducts can be screwed or unscrewed from the valve as required, without rotating the valve on its axis. This is precisely the result intended.

The invention claimed is:

1. A device for stabilizing a valve of a flexible container, the device comprising:
    a valve body including a substantially cylindrically shaped portion and a polygonal protuberance protruding from a bottom of the cylindrical portion of the valve body;
    a stabilizing plate including a first recess corresponding to and following the substantially cylindrically shaped portion of the valve body to receive the substantially cylindrically shaped portion of the valve body and a second recess corresponding to and following the shape of the polygonal protuberance of the valve body to receive the polygonal protuberance of the valve body; and
    two pads of loops and hooks affixed to a proximal surface of the stabilizing plate, wherein the two pads of loops and hooks co-operate with corresponding pads of loops and hooks affixed to an outer surface of the flexible container to detachably connect the stabilizing plate to the flexible container and prevent the valve body from rotating on itself when a drain pipe or fill pipe is screwed to or unscrewed from the valve body.

2. The device according to claim 1 wherein the polygonal protuberance is a flange.

3. The device according to claim 1, wherein the polygonal protuberance is at least partly trapezoidal.

4. The device according to claim 1, wherein the stabilizing plate is made of cellular polypropylene.

5. The device according to claim 2, wherein the flange is square.

6. The device according to claim 1, wherein the polygonal protuberance is a lug in a low position formed by an extension of a through valve key.

7. The device according to claim 1, wherein the two pads of loops and hooks allow the valve body to make small movements.

* * * * *